United States Patent
Yang et al.

(10) Patent No.: US 10,281,956 B2
(45) Date of Patent: May 7, 2019

(54) DISPLAY DEVICE HAVING A FLEXIBLE DISPLAY PANEL

(71) Applicant: Samsung Display Co., Ltd., Yongin (KR)

(72) Inventors: Tae-Hoon Yang, Yongin (KR); So-Youn Jung, Yongin (KR); Jae-Wan Jung, Yongin (KR); Ki-Yong Lee, Yongin (KR); Sang-Wol Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 153 days.

(21) Appl. No.: 14/693,367

(22) Filed: Apr. 22, 2015

(65) Prior Publication Data

US 2016/0048169 A1    Feb. 18, 2016

(30) Foreign Application Priority Data

Aug. 13, 2014  (KR) .................. 10-2014-0105281

(51) Int. Cl.
| | | |
|---|---|---|
| *G06F 1/16* | (2006.01) | |
| *G02F 1/1333* | (2006.01) | |
| *H04M 1/02* | (2006.01) | |

(52) U.S. Cl.
CPC ...... *G06F 1/1652* (2013.01); *G02F 1/133305* (2013.01); *H04M 1/0268* (2013.01)

(58) Field of Classification Search
CPC ............ G06F 1/1652; G02F 1/133305; H04M 1/0268; H05K 1/0271; G04G 17/045
See application file for complete search history.

(56) References Cited

U.S. PATENT DOCUMENTS

| | | | |
|---|---|---|---|
| 6,377,324 B1 * | 4/2002 | Katsura ............ | G02F 1/133305 349/58 |
| 7,071,927 B2 | 7/2006 | Blanchard | |
| 7,787,917 B2 | 8/2010 | Aoki et al. | |
| 8,207,950 B2 | 6/2012 | Ciesla et al. | |
| 8,493,730 B2 | 7/2013 | Shim et al. | |
| 9,047,055 B2 | 6/2015 | Song | |
| 9,235,239 B2 | 1/2016 | Van Dijk et al. | |

(Continued)

FOREIGN PATENT DOCUMENTS

| | | |
|---|---|---|
| CN | 1247618 | 3/2000 |
| CN | 1261245 | 7/2000 |

(Continued)

OTHER PUBLICATIONS

Extended European Search Report dated Nov. 4, 2015, in European Patent Application No. 15172413.5.

(Continued)

*Primary Examiner* — Nidhi Thaker
(74) *Attorney, Agent, or Firm* — H.C. Park & Associates, PLC (57) ABSTRACT

A display device includes a display panel having a bendable part and flat parts, at least one flat part disposed at each side of the bendable part; and a panel guide attached to surfaces of the flat parts of the display panel, in which the display panel is attached to the panel guide when the bendable part is in a state of being tensioned at a reference strain included in an elastic range.

12 Claims, 6 Drawing Sheets

(56) References Cited

U.S. PATENT DOCUMENTS

| | | | |
|---|---|---|---|
| 2006/0132025 A1* | 6/2006 | Gao | H01L 51/52 313/503 |
| 2006/0146488 A1* | 7/2006 | Kimmel | G06F 1/1616 361/679.04 |
| 2011/0140995 A1 | 6/2011 | Hamers et al. | |
| 2012/0002360 A1 | 1/2012 | Seo et al. | |
| 2013/0010405 A1* | 1/2013 | Rothkopf | H04M 1/0216 361/679.01 |
| 2013/0021762 A1 | 1/2013 | Van Dijk et al. | |
| 2013/0037228 A1* | 2/2013 | Verschoor | G06F 1/1652 160/377 |
| 2013/0070431 A1* | 3/2013 | Fukuma | G06F 1/1652 361/749 |
| 2013/0201638 A1 | 8/2013 | Kim | |
| 2014/0240985 A1* | 8/2014 | Kim | H05K 1/028 362/249.04 |
| 2015/0049428 A1* | 2/2015 | Lee | G06F 1/1652 361/679.27 |
| 2016/0062408 A1* | 3/2016 | Lee | G06F 1/1641 345/173 |
| 2016/0081180 A1* | 3/2016 | Huitema | H01L 51/0097 361/749 |
| 2016/0147263 A1* | 5/2016 | Choi | G06F 1/1652 361/679.3 |
| 2016/0209970 A1* | 7/2016 | Lee | G06F 1/1652 |

FOREIGN PATENT DOCUMENTS

| | | | | |
|---|---|---|---|---|
| CN | 101573879 | | 11/2009 | |
| CN | 201781516 | | 3/2011 | |
| CN | 102483675 | | 5/2012 | |
| CN | 103034293 | | 4/2013 | |
| CN | 103927940 | | 7/2014 | |
| EP | 1635313 | | 3/2006 | |
| EP | 1635313 A2 * | | 3/2006 | G06F 1/1616 |
| EP | 1635313 A2 * | | 3/2006 | G06F 1/1616 |
| EP | 1830336 | | 9/2007 | |
| EP | 1830336 A1 * | | 9/2007 | G02F 1/133305 |
| EP | 1830336 A1 * | | 9/2007 | G02F 1/133305 |
| JP | 2013-0174692 | | 9/2013 | |
| KR | 10-2013-0089468 | | 8/2013 | |
| KR | 10-1292974 | | 8/2013 | |

OTHER PUBLICATIONS

Chinese Office Action dated Nov. 1, 2018 issued in Chinese Patent Application No. 201510329692.9.

* cited by examiner

DISPLAY DEVICE HAVING A FLEXIBLE DISPLAY PANEL

CROSS-REFERENCE TO RELATED APPLICATION

This application claims priority to and the benefit under 35 U.S.C. § 119(a) of Korean Patent Application No. 10-2014-0105281, filed on Aug. 13, 2014, the entire disclosure of which is incorporated by reference for all purposes.

BACKGROUND

Field

The following disclosure relates to a display device.

Discussion of the Background

Recently, as a demand for various forms of display device has increased, a demand for a flexible display device of which a display panel included therein is flexible to allow movement has increased.

As one form of the flexible display device, a foldable display device designed to be folded based on a predetermined folding area has an advantage in convenient portability and an expanded screen.

SUMMARY

Exemplary embodiments of the present invention provide a foldable display device, of which a display panel is protected from being permanently deformed.

Additional aspects will be set forth in part in the description which follows and, in part, will be apparent from the description, or may be learned by practice of the presented embodiments.

An exemplary embodiment of the present invention provides a display device, including a display panel having a bendable part and flat parts, at least one flat part disposed at each side of the bendable part; and a panel guide attached to surfaces of the flat parts of the display panel, in which the display panel is attached to the panel guide when the bendable part is in a state of being tensioned at a reference strain included in an elastic range.

Exemplary embodiments of the present invention provide a display device including a display panel having a bendable part and flat parts, the bendable part disposed between the flat parts; and a panel guide attached to at least portions of the flat parts, in which the display panel is moveable between a folded state and an unfolded state, and the display panel is attached to the panel guide when the display panel is in the unfolded state and the bendable part is in a state of being tensioned within an elastic range.

Exemplary embodiments of the present invention provide a display device including a display panel having a bendable part and flat parts, the bendable part disposed between the flat parts; and a panel guide having a folding part and supporting parts attached to portions of the flat parts, in which the display panel is moveable between a folded state and an unfolded state, the display panel is attached to the panel guide when the bendable part is in a state of being tensioned within an elastic range, and the folding part is configured to accommodate the bendable part when the display panel is in the folded state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "between" two elements, it can be the only element between the two elements, or one or more intervening elements may also be present. Like reference numerals refer to like elements throughout.

Figure 1:
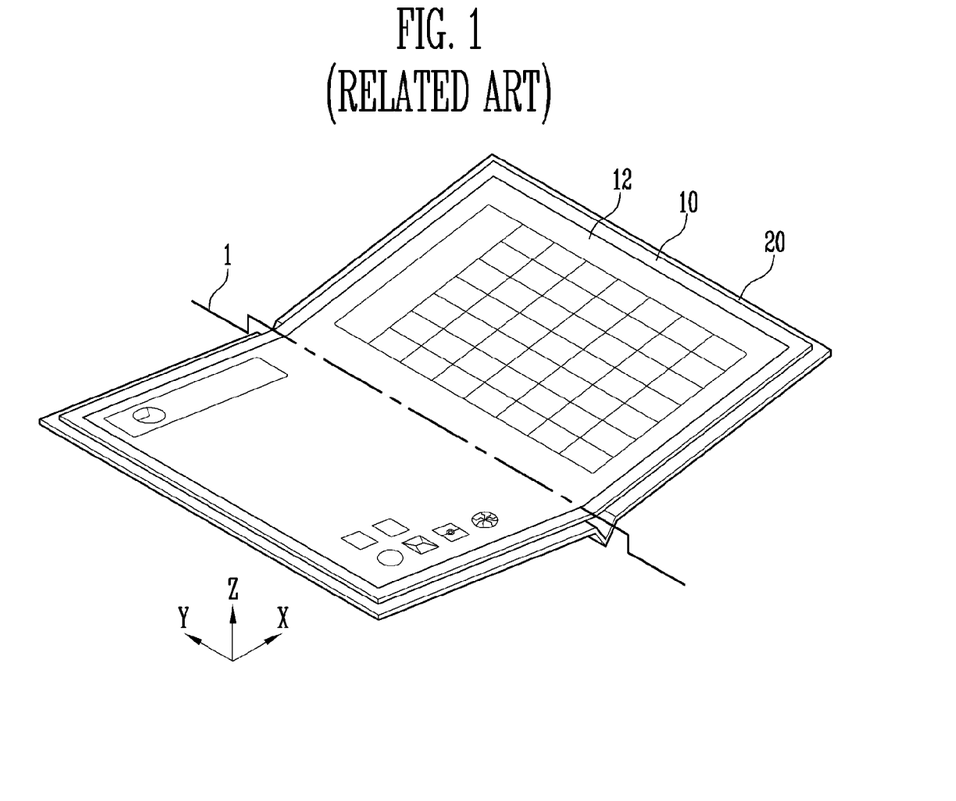
FIG. 1 is a perspective view illustrating an example of a foldable display device according to a related art.

FIG. 1 is a perspective view illustrating an example of a foldable display device according to a related art.

Referring to FIG. 1, the foldable display device is configured to be folded and unfolded along a folding axis 1.

The foldable display device includes a flexible display panel 10, and a panel guide 20 for supporting the flexible display panel 10.

The flexible display panel 10 may be formed of a film material having enough flexibility to be bendable or foldable. The flexible display panel 10 includes a display area 12 having a plurality of pixels (not shown).

For example, the display area 12 may extend through the folding axis 1 as a single screen. More specifically, the display area 12 may extend through the folding axis 1 such that left and right sides (or upper and lower sides) of the folding axis 1 are connected with each other as a single screen.

The panel guide 20 is coupled to the flexible display panel 10 to support and protect the flexible display panel 10. The panel guide 20 may be formed to be foldable along the folding axis 1. In an example, the panel guide 20 may be configured to be foldable by using a hinge.

The foldable display device may be kept and portable in a folded state, thereby improving convenience and providing an expanded screen in an unfolded state.

However, in the foldable display device, stress generated when folding and unfolding the foldable display device is intensively applied to the folding area. Accordingly, the flexible display panel in the folding area may be permanently deformed.

Figure 2A:
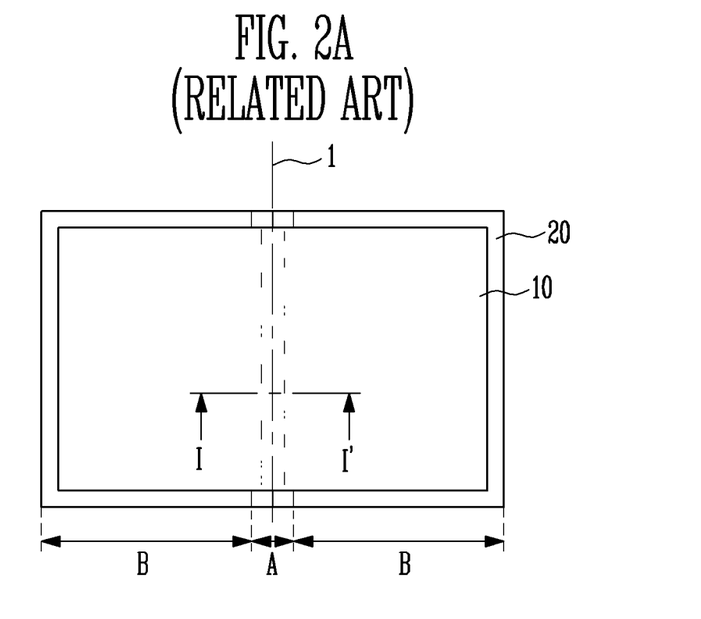
FIG. 2A is a top plan view illustrating an example of a foldable display device in which permanent deformation is generated according to a related art.
Figure 2B:
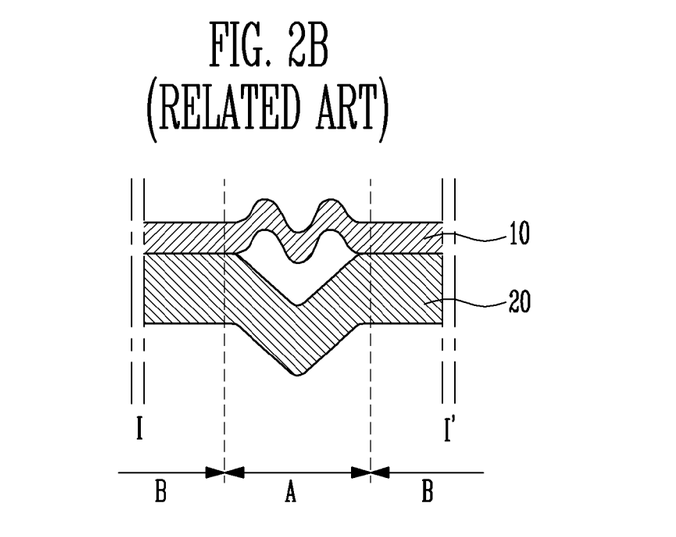
FIG. 2B is a cross-sectional view of a main part taken along line I-I' of FIG. 2A.

FIG. 2A is a top plan view illustrating an example of a foldable display device in which permanent deformation is generated according to a related art. FIG. 2B is a cross-sectional view of a main part taken along line I-I' of FIG. 2A.

Referring to FIGS. 2A and 2B, the foldable display device may be permanently deformed by the stress generated when the foldable display device is folded and unfolded.

More particularly, the stress may be generated and intensively applied to a partial area when the foldable display device is folded and unfolded.

More particularly, the stress generated by the deformation of the foldable display device may be applied to non-folding areas B by a relatively small amount, but may be intensively applied to the folding area A including the folding axis 1.

Accordingly, strain of the flexible display panel 10 in the folding area A may exceed a limitation value recoverable by elasticity. More specifically, if the flexible display panel 10 is subjected to a strain that is beyond a reference value, the flexible display panel 10 may be permanently deformed, such that the screen is broken or no longer intact.

For example, the folding area A of the flexible display panel 10 may be permanently deformed in a vertical direction in which the folding axis 1 extends or in a direction parallel to the vertical direction in which the folding axis 1 extends.

When the flexible display panel 10 is permanently deformed in an area along the folding axis 1, even in the state where the foldable display device is unfolded, the flexible display panel 10 cannot configure a flat screen through the folding axis 1, and further, at least some of a plurality of substrates and/or films configuring the flexible display panel 10 may become broken and/or separated in the folding area A, thereby further degrading a quality of the screen.

Accordingly, aspects of the invention provide a display device capable of preventing or protecting the flexible display panel 10 from becoming permanently deformed by limiting maximum or reference strain of the flexible display panel 10 to be included in an elastic range in which the flexible display panel 10 is recoverable.

Figure 3A:
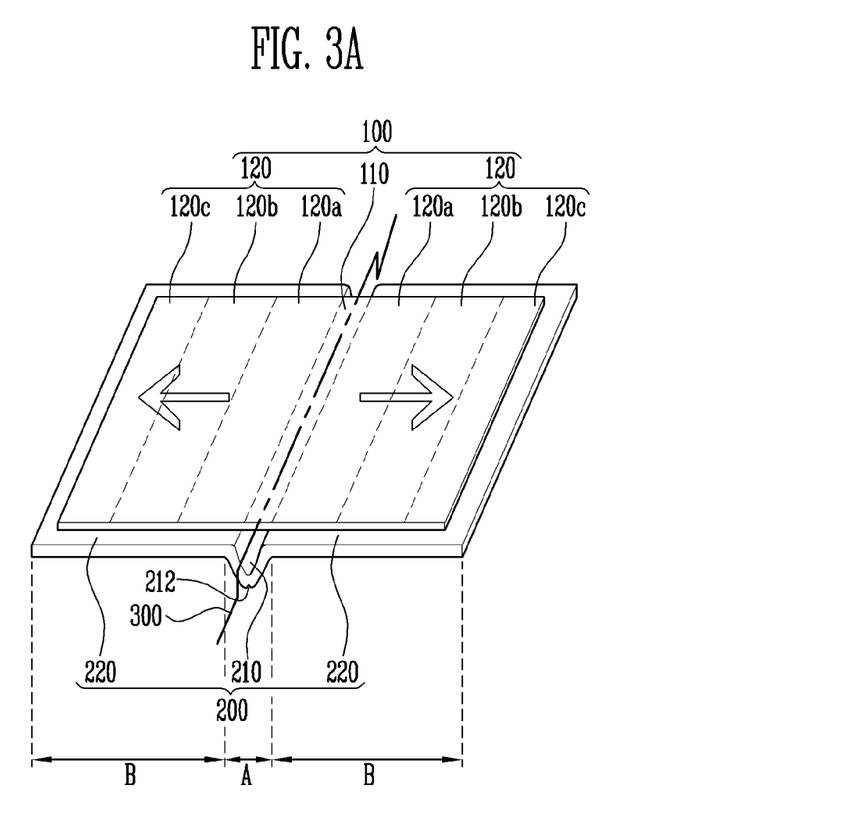
FIG. 3A is a perspective view illustrating a display device according to an exemplary embodiment of the present invention.
Figure 3B:
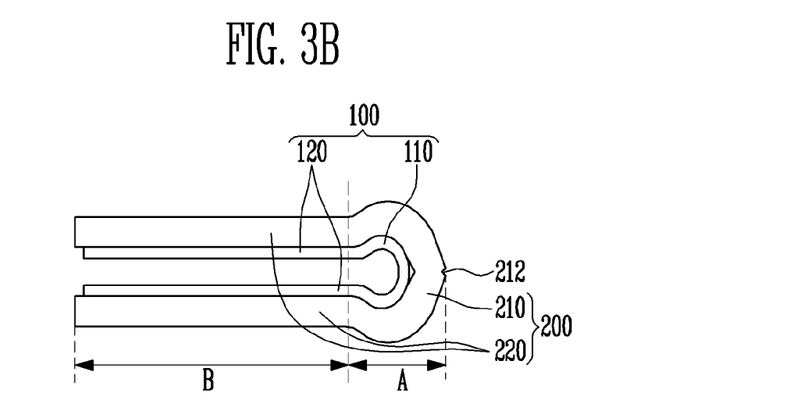
FIG. 3B is a lateral view of the display device of FIG. 3A in a folded state.

FIG. 3A is a perspective view illustrating a display device according to an exemplary embodiment of the present invention. FIG. 3B is a lateral view of the display device of FIG. 3A in a folded state.

Figure 4A:
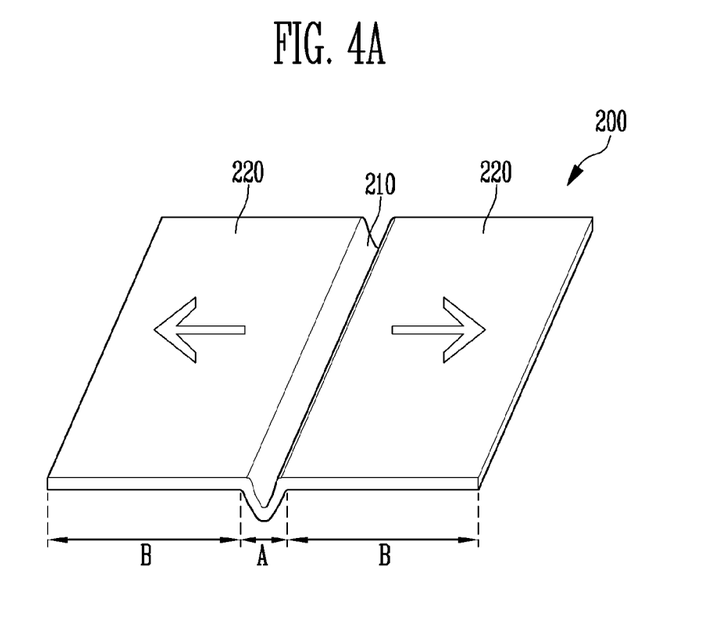
FIG. 4A is a perspective view illustrating a panel guide applicable to the display device illustrated in FIG. 3A according to an exemplary embodiment of the present invention.
Figure 4B:
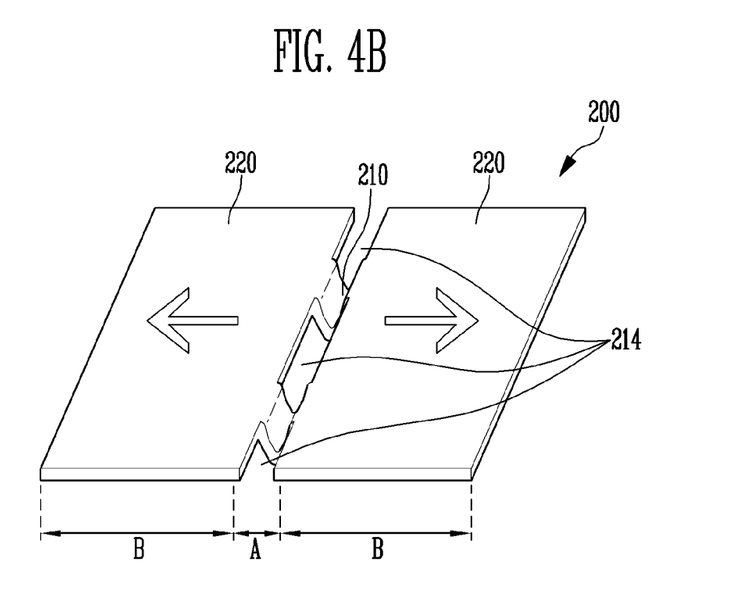
FIG. 4B is a perspective view illustrating a panel guide applicable to the display device illustrated in FIG. 3A according to an exemplary embodiment of the present invention.

FIG. 4A is a perspective view illustrating a panel guide applicable to the display device illustrated in FIG. 3A according to an exemplary embodiment of the present invention. FIG. 4B is a perspective view illustrating a panel guide applicable to the display device illustrated in FIG. 3A according to an exemplary embodiment of the present invention.

Figure 5:
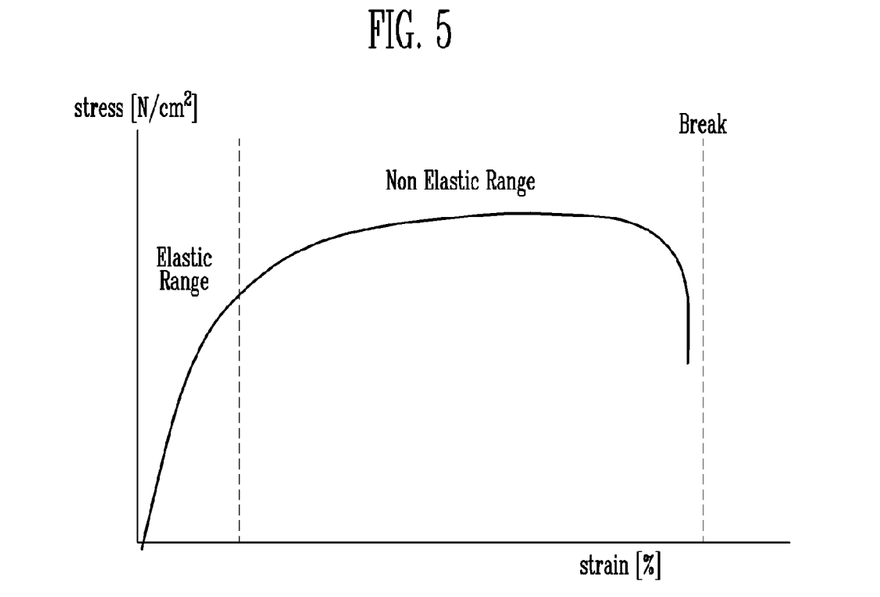
FIG. 5 is a graph illustrating a stress curve of a flexible display panel according to an exemplary embodiment of the present invention.

FIG. 5 is a graph illustrating a stress curve of a flexible display panel according to an exemplary embodiment of the present invention.

First, referring to FIGS. 3A and 3B, a display device includes a flexible display panel 100 having at least one area thereof that is bendable or foldable, and a panel guide 200 disposed on one surface of the flexible display panel 100 to support the flexible display panel 100. The display device may be, for example, a foldable display device designed to be folded and unfolded along a folding axis 300.

The flexible display panel 100 includes a bendable part 110 and flat parts 120 at both sides of the bendable part 110.

For example, the flexible display panel 100 may be formed based on a film material having flexibility enough to be bendable or foldable to a reference amount before being subjected to permanent deformation. For example, a relatively flexible film material, such as polycarbonate (PC), polyethylene terephthalate (PET), and/or polyimide (PI), which may be processed to be thin, or an elastomer film having excellent elasticity may be used as various substrates configuring the flexible display panel 100, thereby providing flexibility of the flexible display panel 100.

However, an area or portion of the flexible display panel 100, which may be configured to be bendable or foldable in the area of the flexible display panel 100, may be set as the bendable part 110, and other areas may be set as the flat parts 120. Further, at least one area of the flat part 120 may be attached to the relatively hard panel guide 200 by using an adhesive (not shown) or the like.

The bendable part 110, which may not be attached to the panel guide 200, may maintain flexibility of the flexible display panel 100 itself to be bendable or foldable, and the flat parts 120 attached to the panel guide 200 may be restricted from being deformed but may be stably fixed and supported by the panel guide 200.

Referring to FIGS. 3A to 4B, the bendable part 110 of the flexible display panel 100 may refer to an area corresponding to the folding area A of the display device, and the flat parts 120 may refer to areas corresponding to the non-folding areas B of the display device.

To aid in distinguishing the bendable part 110 from the flat parts 120, a shape of the flat part 120 may be described as a planar form having no curve. However, aspects of the invention are not limited thereto, such that the flat part 120 may be configured to have different shapes. For example, the flat part 120 may be attached to a curved panel guide having a predetermined curvature to have a shape corresponding to the curved panel guide.

The panel guide 200 may be disposed under or over at least one surface of the flexible display panel 100 to protect and support the flexible display panel 100.

For example, the panel guide 200 may be coupled to the flexible display panel 100 on a rear surface of the flexible display panel 100. The panel guide 200 may stably support the flexible display panel 100 at a lower part when the flexible display panel 100 is unfolded, and generally cover an external surface of the flexible display panel 100 and protect the flexible display panel 100 when the flexible display panel 100 is folded.

For example, the panel guide 200 may be harder than the flexible display panel 100 to effectively support and protect the flexible display panel 100.

More specifically, the panel guide 200 may be formed of a material having a greater hardness that those of various substrate materials configuring the flexible display panel 100, or the same material as those of at least some of the substrate materials used in the flexible display panel 100. Further, the panel guide 200 may be formed to be thicker than the flexible display panel 100 to have a higher hardness. Materials similar to those used in forming a case of various display devices may be used as a material for the panel guide 200.

When the display device is the foldable display device designed to be foldable along or around the predetermined folding axis 300, portions of the panel guide 200 may be attached to the flexible display panel 100 in an area of at least a part of the non-folding area B. Portions of the panel guide 200 may not be attached to the flexible display panel 100 in the predetermined folding area A in which the folding axis 300 is disposed.

More specifically, the panel guide 200 may overlap the flexible display panel 100, and may be attached to the flexible display panel 100 in at least an area of the flat part 120 except for the bendable part 110 of the flexible display panel 100.

The panel guide 200 includes a folding part 210 corresponding to the bendable part 110 of the flexible display panel 100, and supporting parts 220 corresponding to the flat parts 120 of the flexible display panel 100.

More specifically, in the display device, the bendable part 110 of the flexible display panel 100 may be disposed to overlap the folding part 210 of the panel guide 200 in the folding area A of the display device, and the flat parts 120 of the flexible display panel 100 may be disposed to overlap the supporting parts 220 of the panel guide 200 in the non-folding area B of the display device.

The folding part 210 of the panel guide 200 may be formed or configured to be bendable or foldable along the predetermined folding axis 300, or may be configured to be foldable and unfoldable by using a hinge.

For example, the folding part 210 of the panel guide 200 may be configured in an angulated form to be foldable based on the folding axis 300. For example, the folding part 210 may be configured to be angulated and curved along the folding axis 300 similar to the exemplary embodiment illustrated in FIGS. 3A and 3B. Further, the folding part 210 may be configured to be curved or rounded in the interior to accommodate the bendable part 110 when the display device is in a folded state.

The folding part 210 of the panel guide 200 may be configured to have an area to sufficiently accommodate the bendable part 110. More specifically, the folding part 210 may be configured to accommodate the bendable part 110 of the flexible display panel 100 when the bendable part 110 is folded and extended to a reference or maximum amount.

However, according to aspects of the invention, the folding part 210 of the panel guide 200 may be configured to completely cover or only partially cover the bendable part 110. In an example, the folding part 210 may be configured to partially cover the bendable part 110 and the folding part 210 may be variously changed.

For example, as illustrated in FIG. 4A, the folding part 210 of the panel guide 200 may be formed in the entire folding area A. More specifically, the panel guide 200 may extend through, as a whole, through the folding part 210. The folding part 210 may completely overlap the bendable part 110 of the flexible display panel 100 to completely cover one surface of the bendable part 110.

However, aspects of the invention are not limited thereto, such that the folding part 210 may be configured to only partially cover the bendable part 110.

For example, as illustrated in FIG. 4B, the folding part 210 of the panel guide 200 may be non-continuously formed in a part of the folding area A. More specifically, the panel guide 200 may extend through only portions of the folding part 210, such that some portions of the left panel guide 200 are not connected to portions of the right panel guide 200. For example, the folding part 210 may include one or more openings 214 formed at least one area of the folding area A. More specifically, the folding part 210 may expose a portion of the bendable part 110 of the flexible display panel 100 in the area in which the opening 214 is formed.

More specifically, referring to FIGS. 3A and 3B, a structure of the panel guide 200 may be additionally changed or configured so that the panel guide 200 may be more easily folded and unfolded.

For example, in configuring the panel guide 200, the panel guide 200 may be formed to be angulated and/or curved along a border of the folding part 210 and the supporting parts 220, such that the panel guide 200 may be more easily folded and unfolded.

Further, one or more recesses or slits may be formed in the area of the folding part 210 of the panel guide 200 in which the folding axis 300 is positioned. For example, a recess 212 corresponding to the folding axis 300 may be formed in the folding part 210.

In addition, it may be possible to improve flexibility of the folding part 210 by forming the folding part 210 to be thinner than the supporting parts 220.

According to the exemplary embodiments of the present invention, it may be possible to implement the foldable display device by attaching the flexible display panel 100 to the panel guide 200 configured to be easily bendable or foldable in the predetermined folding area A.

However, according to aspects of the invention, the flexible display panel 100 may be attached to the panel guide 200 when predetermined tension is applied to the flexible display panel 100 so that the flexible display panel 100 may be in a tensioned state or an extended state.

More particularly, even though a reference (e.g., maximum) tension may be applied to the flexible display panel 100 when folding or unfolding the flexible display panel 100, at least one area of the flat part 120 may be attached to the supporting parts 220 of the panel guide 200 to be supported when the flexible display panel 100 is in a tension state according to a reference tension or strain. The reference or maximum tension or strain may be included in an elastic range, such that the flexible display panel 100 may return to its original shape or form when such tension or strain in removed or reduced.

According to aspects of the invention, the elastic range may refer to a section in which the flexible display panel 100 may be bent or deformed within a strain range such that the original form, or form prior to the bending or deformation, of the flexible display panel 100 may be recoverable based on its elasticity.

The elastic range may be determined according to a value of a property of a material. An example of strain of each section of the substrate materials that may be usable in the flexible display panel 100 is represented in Table 1 below.

TABLE 1

| Stack material | Strain of elastic range | Strain of permanent deformation section |
| --- | --- | --- |
| PC | 0~4.2 [%] | 4.2~11.19 [%] |
| PET | 0~2.7 [%] | 2.7~8.62 [%] |
| PI | 0~2.0 [%] | 2.0~35.95 [%] |
| Pol. | 0~2.91 [%] | 2.91 [%] |

Table 1 indicates strain of an elastic range or a range of elastic strain, which a stack material may be subjected to without being permanently deformed. Further, Table 1 also indicates a strain of permanent deformation section or a range of strain that permanently deforms a stack material, more specifically, a range of strain which a stack material may be subjected to become permanently deformed without breakage. Stack or film materials, such as polycarbonate (PC), polyethylene terephthalate (PET), and/or polyimide (PI), may be included in a stack structure of the flexible display panel 100. However, aspects of the invention are not limited thereto, such that stack materials may include materials of different materials.

Further, the elastic range in which the flexible display panel 100 may be able to recover its form by itself may be comprehensively or at least in part determined according to various substrate materials configuring the flexible display panel 100.

According to aspects of the invention, a elastic range may refer to a section in which the flexible display panel may be able recover its shape by itself when strain or stress that were placed upon it is removed or reduced. Further, the elastic range may correspond to a linear section of a stress curve according to strain of FIG. 5. When a strain included in the elastic range is applied to a film material, the film material may be restored to an original state by its restoration force when the predetermined tension or strain is removed or reduced.

Further, a permanent deformation section may refer to a section in which the flexible display panel cannot be restored to its original shape by itself after being exposed to the strain or tension. Further, the permanent deformation section may correspond to a strain between the non-elastic range and break in the stress curve according to the strain of FIG. 5. When a film material is subjected to the strain included in the permanent deformation section, the film material may be unable or have difficulty in being restored to its original state by restoration force when the applied tension or strain is removed or reduced, thereby being permanently deformed.

Further, when the film material is subjected to a strain or tension exceeding a maximum or reference value of the permanent deformation section, the respective film material may incur breakage.

Accordingly, to prevent or protect the flexible display panel 100 from being permanently deformed, the maximum or reference strain of the flexible display panel 100 may be limited to be included in the elastic range.

For example, a maximum or reference strain value may be set to, for example, 2.0% in Table 1, for some or all of the substrate materials configuring the flexible display panel 100. Further, the flexible display panel 100 may be restricted to be subjected to a strain, tension, or stress within a range equal to or smaller than the reference strain. However, aspects of the invention are not limited thereto, such that the maximum or reference strain may be set considering only the main substrate materials of the flexible display panel 100.

In the general foldable display device, stress according to the bending or folding motion may be intensively applied to the folding area A, such that strain applied to the bendable part 110 of the flexible display panel 100 exceeds the elastic range to be easily and permanently deformed.

However, in the exemplary embodiments of the present invention, the flat parts 120 may be attached to the panel guide 200 by tensioning the bendable part 110 in a direction normal to the folding axis 300. More specifically, opposite ends of the flat parts 120 may be extended away from the bendable part 110 in a direction normal to the folding axis 300. Further, the flat parts 120 may be attached when the flexible display panel 100 is flatly unfolded or unfolded to be flat, such that the maximum or reference strain of the bendable part 110 is included in the elastic range.

For example, the flat parts 120 of the flexible display panel 100 may be attached to the panel guide 200 when the flexible display panel 100 is tensioned so that the maximum or the reference strain applicable to the bendable part 110 of the flexible display panel 100 may be included in the elastic range of the plurality of substrates or films configuring the flexible display panel 100.

Further, the strain generated while the flat parts 120 of the flexible display panel 100 are in tension may be set to be included in the elastic range. However, the flat parts 120 are stably fixed by the panel guide 200, such that aspects of the present invention are not limited to the case where the flat parts 120 are tensioned in a degree included in the elastic range.

As described above, when the flat parts 120 of the flexible display panel 100 are attached to the panel guide 200 while the flexible display panel 100 is in a tensioned state, the stress concentrated to the bendable part 110 may be distributed, and it may be possible to limit the maximum or reference strain of the bendable part 110 to be included in the elastic range in a foldable display device.

Accordingly, when the maximum tension is applied to the flexible display panel 100, for example, in the state where the display device is completely unfolded, the maximum strain of the bendable part 110 may be limited to be included in the elastic range. Accordingly, the flexible display panel 100 may be prevented or protected from being permanently deformed. Further, when the display device is in a folded state, the strain applied to the bendable part 110 may be decreased, such that the bendable part 110 may be restored to its original state.

According to exemplary embodiments of the present invention, the flexible display panel 100 may be attached to the panel guide 200 when the flexible display panel 100 is in a tensioned state so that the maximum or reference strain applicable to the bendable part 110 of the flexible display panel 100 may be included in the elastic range. Accordingly, the flexible display panel 100 may be prevented or protected from being permanently deformed.

Further, when the flexible display panel 100 is attached to the panel guide 200 when the flexible display panel 100 is in a tensioned state, tension may be evenly applied in two directions from the bendable part 110 towards ends of the flat parts 120. Accordingly, the flexible display panel 100 may be stably coupled to the panel guide 200.

More specifically, at least one area of the flat part 120 may be attached to the panel guide 200 so that the tension may be applied from the bendable part 110 towards opposite ends of the flat parts 120 in the state where the flexible display panel 100 is flatly unfolded or unfolded to be flat. Further, the applied tension may be adjusted to be evenly applied.

Further, the bendable part 120 of the flexible display panel 100 and the supporting parts 220 of the panel guide 200 may be completely attached to each other in the non-folding area B, or in a partial area of the non-folding area B.

The stress and the strain applied to the flexible display panel 100 may be different according to a position or an area of the attachment area. Accordingly, it may be possible to adjust the attachment area by considering the stress and the strain generated when the display device is folded and unfolded.

More particularly, when the flat parts 120 are attached to the panel guide 200 while the flexible display panel 100 is in a tensioned state, such that the tension is symmetrically applied from the bendable part 110 towards ends of the flat parts 120 in both directions, it may be possible to stably couple the flexible display panel 100 with the panel guide 200.

The flat parts 120 may be completely attached to the panel guide 200 while tension is evenly applied in both directions based on the folding axis 300 of the flexible display panel 100.

Further, the flat parts 120 of the flexible display panel 100 may be divided into a plurality of areas, which may be symmetric based on the bendable part 110, and some areas among the plurality of areas may be selectively attached to the panel guide 200. In this case, the attachment area of the flexible display panel 100 and the panel guide 200 may be set to be symmetric to each other based on the folding axis 300.

More specifically, it may be possible to adjust the stress and the strain generated when the display device is folded and unfolded by attaching select areas of the flat parts 120 to the panel guide 200. Further, the flat parts 120 may be attached to the panel guide 200 to be symmetric to each other based on the folding axis 300.

For example, as illustrated in FIG. 3A, the flat parts 120 at both sides of the bendable part 110 may be symmetrically divided into first areas 120a, second areas 120b, and third areas 120c according to a distance from the folding axis 300. Further, some of the first to third areas 120a, 120b, and 120c may be selectively attached to the panel guide 200.

Accordingly, it may be possible to distribute the stress applied on the bendable part 110 to both sides of the flexible display panel 100. Further, stress may be distributed uniformly.

Although the display device is illustrated to be configured in a particular form in FIGS. 3A to 4B, illustrated embodiments are simply exemplary for describing aspects of the present invention, but the aspects of the present invention are not limited thereto. For example, a form or a structure of the display device according to exemplary embodiments of the present invention may be partially changed as illustrated in FIGS. 6A to 7B to be implemented.

Figure 6A:
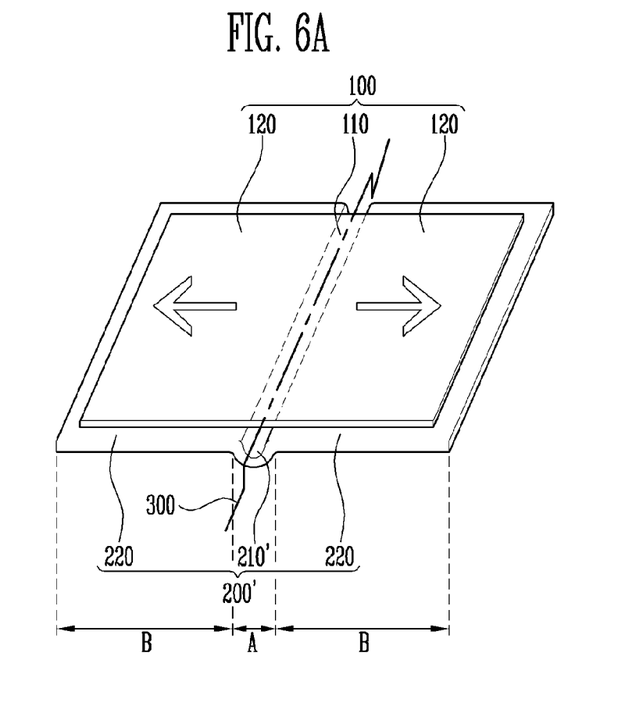
FIG. 6A is a perspective view illustrating a display device according to an exemplary embodiment of the present invention.
Figure 6B:
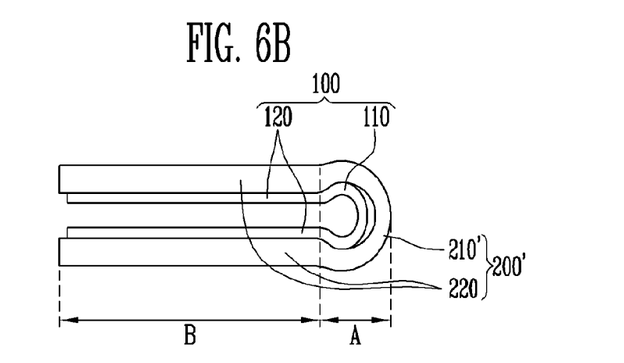
FIG. 6B is a lateral view of the display device of FIG. 6A in a folded state.

FIG. 6A is a perspective view illustrating a display device according to an exemplary embodiment of the present invention. FIG. 6B is a lateral view of the display device of FIG. 6A in a folded state. In describing the display device with reference to FIGS. 6A and 6B, the same or similar elements to those of the exemplary embodiment illustrated in FIGS. 3A and 3B are denoted by the same reference numerals, and detailed descriptions thereof will be omitted.

Referring to FIGS. 6A and 6B, a folding part 210' of the panel guide 200' may be configured to have a smooth curved surface having a predetermined curvature, instead of being angulated and curved.

For example, the folding part 210' may be configured in a round shape to have a curvature equal to or greater than a maximum or reference curvature of a bendable part 110 of a flexible display panel 100. The panel guide 200' may be easily folded based on a folding area A as an axis, and stably accommodate the bendable part 110 of the flexible display panel 100 in the folding area A.

According to exemplary embodiments, the folding part 210' and supporting parts 220 may be configured to have different thicknesses. For example, the folding part' may be configured to be thinner than the supporting parts 220. Accordingly, flexibility of the folding part 210' may be improved to allow easier movement, such as curving or folding and unfolding the display device.

However, aspects of the invention are not limited thereto, such that the folding part 210' and the supporting parts 220 may be configured to have the same thickness.

Further, in the aforementioned exemplary embodiments, the display device in which the panel guide 200 is integrally formed in the entire area including the folding part 210 or 210' and the supporting parts 220 is illustrated, but aspects of the invention are not limited thereto.

Figure 7A:
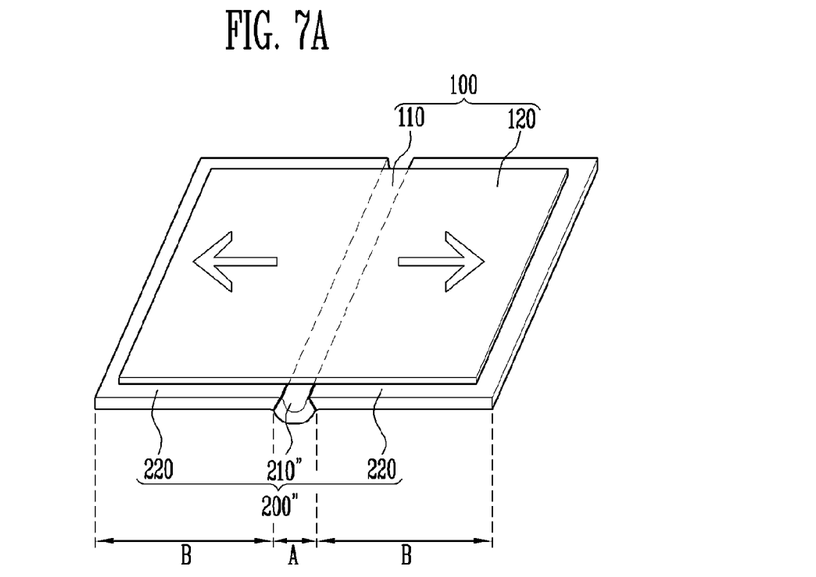
FIG. 7A is a perspective view illustrating a display device according to an exemplary embodiment of the present invention.
Figure 7B:
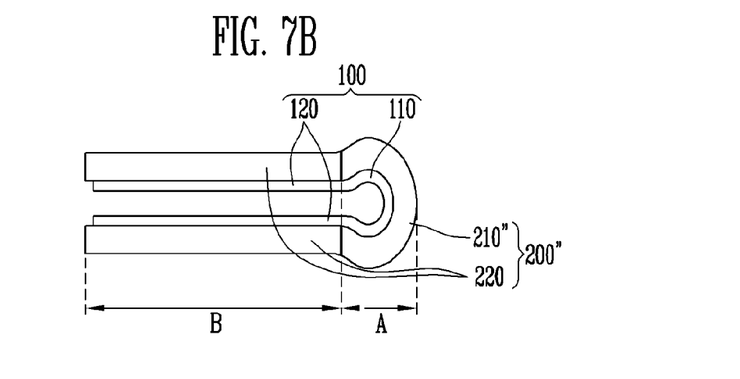
FIG. 7B is a lateral view of the display device of FIG. 7A in a folded state.

For example, similar to a display device illustrated in FIGS. 7A and 7B, a panel guide 200" may be designed so that a folding part 210" may be formed of a different material from that of supporting parts to be hetero functioned.

FIG. 7A is a perspective view illustrating a display device according to an exemplary embodiment of the present invention. FIG. 7B is a lateral view of the display device of FIG. 7A in a folded state.

The folding part 210" may be formed of a soft material, for example, rubber, having lower hardness than that of the supporting part 220, such that the display device may be easily folded and unfolded.

According to aspects of the invention, for the foldable display device, stress may be generated when the foldable display device is folded or unfolded and concentrated in the folding area. Accordingly, the display panel in the folding area may be at risk of being permanently deformed.

According to exemplary embodiments of the present invention, the flexible display panel, which may be configured to be bendable or foldable in at least a predetermined bendable or flexible part, may be attached to the panel guide in the state of being tensioned by a predetermined tension.

More particularly, according to the exemplary embodiments of the present invention, the flexible display panel may be fixed to the panel guide in the state of being tensioned by predetermined force so that a designated or reference strain limit of the flexible display panel is included in the elastic range, in which the flexible display panel may be able to recover its original shape or form when stress or strain is removed or reduced. Further, the flexible display panel may be able to recover its shape even when the designated strain is applied to the flexible display panel by an action of folding or unfolding the flexible display panel. Accordingly, it may be possible to provide the foldable display device, of which the panel may be prevented or protected from being permanently deformed.

Exemplary embodiments have been disclosed herein, and although specific terms are employed, they are used and are to be interpreted in a generic and descriptive sense only and not for purpose of limitation. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a foldable display device which is foldable around a folding axis, the foldable display device having a display panel comprising a bendable part and flat parts, at least one flat part disposed at each side of the bendable part and a panel guide attached to surfaces of the flat parts of the display panel, the method comprising:

extending opposite ends of the flat parts away from the bendable part in a direction normal to the folding axis such that the bendable part is subject to a tension that falls within an elastic range; and attaching the display panel to the panel guide while the bendable part is under the tension.

2. The method of claim 1, wherein the tension of the bendable part is a maximum tension the bendable part is able to withstand without permanent deformation.

3. The method of claim 1, wherein the flat parts are attached to the panel guide so that the tension is symmetrically applied based on the bendable part.

4. The method of claim 1, wherein the panel guide comprises:

a folding part corresponding to the bendable part of the display panel; and supporting parts corresponding to the flat parts of the display panel.

5. The method of claim 4, wherein the folding part is configured in an angulated form to be foldable based on the folding axis.

6. The method of claim 4, wherein the folding part has a round shape having a curvature equal to or greater than a maximum curvature of the bendable part.

7. The method of claim 4, wherein the folding part and the supporting parts have different thicknesses.

8. The method of claim 7, wherein the folding part is thinner than the supporting parts.

9. The method of claim 4, wherein the folding part includes one or more recesses or slits in an area in which the folding axis is positioned.

10. The method of claim 4, wherein the folding part and the supporting parts are formed of different materials, and/or wherein the folding part is formed of a material having a lower hardness than the supporting parts.

11. The method of claim 4, wherein the folding part overlaps at least a portion of the bendable part.

12. The method of claim 4, wherein the folding part comprises one or more openings exposing a portion of the bendable part.

* * * * *